US011135958B2

(12) United States Patent
Chaer et al.

(10) Patent No.: US 11,135,958 B2
(45) Date of Patent: Oct. 5, 2021

(54) FRAME ASSEMBLY FOR A VEHICLE SEAT (71) Applicant: Ningbo Jifeng Auto Parts Co., Ltd., Ningbo (CN)

(72) Inventors: Louay Chaer, Dearborn Heights, MI (US); Matthew Mu, Ningno (CN); Hangkai Zhu, Ningbo (CN)

(73) Assignee: NINGBO JIFENG AUTO PARTS CO., LTD., Ningbo (CN)

( * ) Notice: Subject to any disclaimer, the term of this patent is extended or adjusted under 35 U.S.C. 154(b) by 0 days.

(21) Appl. No.: 16/809,921

(22) Filed: Mar. 5, 2020

(65) Prior Publication Data
US 2020/0282887 A1 Sep. 10, 2020

Related U.S. Application Data (60) Provisional application No. 62/813,812, filed on Mar. 5, 2019.

(51) Int. Cl.
*B60N 2/847* (2018.01)
*B60N 2/874* (2018.01)
*B60N 2/68* (2006.01)

(52) U.S. Cl.
CPC ............. *B60N 2/847* (2018.02); *B60N 2/682* (2013.01); *B60N 2/874* (2018.02)

(58) Field of Classification Search
CPC ........... B60N 2/85; B60N 2/847; B60N 2/874
See application file for complete search history.

(56) References Cited

U.S. PATENT DOCUMENTS

| 4,576,413 A | * | 3/1986 | Hatta | B60N 2/847 297/408 |
| 5,011,225 A | * | 4/1991 | Nemoto | B60N 2/856 297/408 |
| 5,011,226 A | * | 4/1991 | Ikeda | B60N 2/859 297/408 |
| 5,669,666 A | * | 9/1997 | Lee | B60N 2/853 297/408 |

(Continued)

FOREIGN PATENT DOCUMENTS

| CN | 108394328 A | 8/2018 | |
| DE | 102015109656 A1 | * 12/2015 | ............. B60N 2/856 |

(Continued)

*Primary Examiner* — Timothy J Brindley
(74) *Attorney, Agent, or Firm* — Dickinson Wright PLLC (57) ABSTRACT

A frame assembly for a vehicle seat includes a headrest frame including at least one support pole extending downwardly from the headrest frame and a seatback frame having a central body and a pair of outer brackets extending outwardly from the central body in spaced relationship to one another. A crossbar extends between and is rotatable relative to the pair of outer brackets. The at least one support pole is secured to the crossbar for facilitating concurrent rotation of the headrest frame with the crossbar. A locking mechanism is operably interconnected with the crossbar. An actuator is movable from a first actuator position to a second actuator position to engage the locking mechanism and move the locking mechanism from a locked condition to an unlocked condition. A slide shaft extends between the pair of outer brackets and supports the actuator during movement between the first and second actuator positions.

15 Claims, 8 Drawing Sheets

(56) References Cited

U.S. PATENT DOCUMENTS

| | | | | |
|---|---|---|---|---|
| 6,860,564 | B2 * | 3/2005 | Reed | B60N 2/20 |
| | | | | 297/408 |
| 7,341,312 | B2 * | 3/2008 | Gauthier | B60N 2/80 |
| | | | | 297/408 |
| 2006/0163930 | A1 * | 7/2006 | Pettersson | B60N 2/888 |
| | | | | 297/408 |
| 2015/0266402 | A1 * | 9/2015 | Lutzka | B60N 2/856 |
| | | | | 297/61 |
| 2018/0065522 | A1 * | 3/2018 | Muldowney | B60N 2/856 |
| 2020/0384903 | A1 * | 12/2020 | Xu | B60N 2/844 |

FOREIGN PATENT DOCUMENTS

| | | | | |
|---|---|---|---|---|
| EP | 0756964 A2 * | 2/1997 | | B60N 2/859 |
| EP | 2777984 A1 * | 9/2014 | | B60N 2/876 |
| WO | WO-2013081630 A1 * | 6/2013 | | B60N 2/206 |
| WO | WO-2017022250 A1 * | 2/2017 | | B60N 2/806 |

* cited by examiner

FRAME ASSEMBLY FOR A VEHICLE SEAT

CROSS-REFERENCE TO RELATED APPLICATION

This application claims the benefit of U.S. Provisional Patent Application Ser. No. 62/813,812 filed on Mar. 5, 2019, the entire disclosure of which is incorporated herein by reference.

BACKGROUND OF THE INVENTION

1. Field of the Invention

The subject disclosure relates in general to vehicle seats, and more particularly to a vehicle seat having a rotatable headrest.

2. Description of the Related Art

This section of the written disclosure provides background information related to headrests such as rotatable headrests for passenger seating in transportation vehicles and is not necessarily prior art to the inventive concepts disclosed and claimed in this application.

Passenger seating in transportation vehicles, such as but not limited to cars, trucks, vans, sport utility vehicles (SUVs), buses, trains, and boats, may offer a headrest for use in association with a seatback. The headrest may be an integrated headrest fixed to the seatback as a raised "hump" at the approximate location where a passenger's head may come to rest. However, in some other cases, the seatback may include a moveable or rotatable headrest. The moveable headrest may include one or more poles or shafts upon which the headrest is mounted and movably secured to the seatback to allow the moveable headrest to travel from a folded position that is in contact with a top of the seatback (headrest down) to an upright position that is a distance above the top of the seatback (headrest up). Additionally there may be intermediate positions of travel in between the first and the second positions. Typically, movable headrests include a locking mechanism to prevent unintended movement. These locking mechanisms may utilize detents in one or more of the poles and a locking ring located at the top of the seatback through which the pole travels. However, both the integrated headrest and the movable headrest have disadvantages.

For example, a first disadvantage of the integrated headrest is that it is permanent and not removable. Another disadvantage is that the integrated headrest may obstruct rearward visibility of the driver. A further disadvantage is that the integrated headrest increases the dimensions of the seatback, which may complicate the folding of the seatback from a vertical position for use by a passenger to a horizontal position for storage. Yet another disadvantage is that the integrated headrest may prevent the desired folding of the seatback, such as to form a flat load floor using the back side of the seatback.

The moveable headrest also has several disadvantages, such as that while the moveable headrest may be removable (some may prevent removal) the removed moveable headrest must be stowed somewhere. Another disadvantage of the moveable headrest is that if the moveable headrest is stowed outside the vehicle, the seatback may not be safe for passenger use without the removed moveable headrest, due to increasing safety standards. Yet another disadvantage of the moveable headrest is that if the moveable headrest is stowed within the vehicle, the removed moveable headrest should be stowed in a secure location, to prevent the removed headrest from becoming lost or becoming a projectile in the event of a vehicular collision.

Second and third row seats of motor vehicles are often configured to fold down to allow for more efficient use of cargo area or for removal of the seats. Prior headrests have used a locking mechanism and rotatable crossbar located in the headrest of second row seats. However, while this can work for second row seats, third row seats often have different packaging considerations (e.g., reduced leg room, extent of folding, etc.) and preferably make use of a thinner headrest preferable. However, having a thinner headrest makes placement of the locking mechanism and rotatable crossbar within the headrest of third-row seating untenable. Further, using the same design and simply placing the locking mechanism and cross-bar in the seat-back would not provide enough structural strength to withstand the prescribed loads, given a longer lever arm associated with placing the locking mechanism and cross-bar in the seat-back as compared to the headrest.

One example of such a prior headrest is CN108394328, which discloses a seat frame including a headrest frame disposed within a headrest that includes a pair of support poles extending downward from the headrest frame. The headrest frame includes a central body and a pair of outer brackets which extend outward from the central body in spaced relationship relative to one another. A crossbar extends between and is rotatable relative to the pair of outer brackets. The support poles are secured to the crossbar for facilitating concurrent rotation of the headrest frame with the crossbar. A locking mechanism is operably interconnected with the crossbar and interchangeable between a locked condition and an unlocked condition to respectively prevent and allow rotation of the crossbar. An actuator is movable from a first actuator position to a second actuator position to engage the locking mechanism and move the locking mechanism from the locked condition to the unlocked condition and allow for concurrent rotation of the crossbar the headrest frame.

However, as previously mentioned, prior art seat frame designs, such as the one disclosed in CN108394328, do not allow for the use of a thinner headrest and, if unchanged and placed into the seatback to allow for use in third-row seating, fail to withstand prescribed loads. As will be appreciated, placing the locking mechanism and crossbar within a seat-back instead of within a headrest allows for the use of a thinner headrest, but further changes are necessary to provide structural integrity. Accordingly, a continuing need exists for providing seat frames having locking-mechanisms and cross-bars with improved structural integrity.

SUMMARY OF THE INVENTION

This section provides a general summary of the invention and is not intended to be a comprehensive disclosure of its full scope, aspects, objectives, and/or all of its features.

A frame assembly for a vehicle seat according to the subject disclosure includes a headrest frame. The headrest frame includes at least one support pole that extends downwardly from the headrest frame. The frame assembly further includes a seatback frame that has a central body and a pair of outer brackets that extend outward from the central body in spaced relationship to one another. A crossbar extends between and is rotatable relative to the pair of outer brackets. The at least one support pole is secured to the crossbar for facilitating concurrent rotation of the headrest frame with the crossbar. A locking mechanism is operably interconnected with the crossbar and interchangeable between a locked condition and an unlocked condition to respectively prevent and allow rotation of the crossbar. The frame assembly includes an actuator that is movable from a first actuator position to a second actuator position to engage the locking mechanism and move the locking mechanism from the locked condition to the unlocked condition to allow for concurrent rotation of the crossbar the headrest frame. A slide shaft extends between the pair of outer brackets and supports the actuator during movement between the first and second actuator positions. The slide shaft extending between the pair of outer brackets improves structural integrity by providing rigidity to the frame assembly, particularly when a frontward load is applied to the headrest.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE ENABLING EMBODIMENTS

Example embodiments will now be described more fully with reference to the accompanying drawings. The example embodiments are provided so that this disclosure will be thorough and fully convey the scope to those skilled in the art. Numerous specific details are set forth such as examples of specific components, devices, mechanisms, assemblies, and methods to provide a thorough understanding of various embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail. It should also be appreciated that the present disclosure can be utilized in connection with other types of vehicle or system components not described fully herein.

Figure 1:
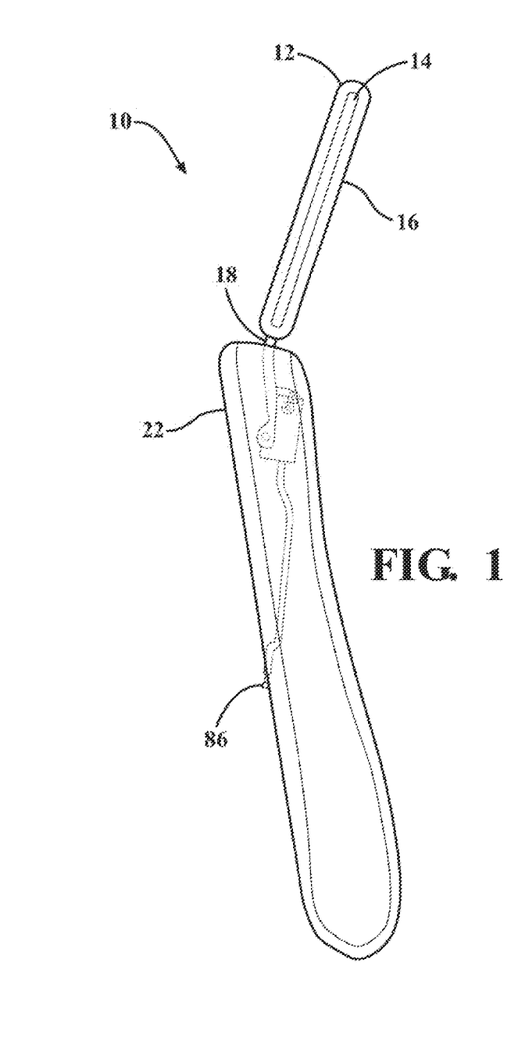
FIG. 1 is a side view of a seat frame assembly illustrating a headrest disposed in an upright headrest position.
Figure 2:
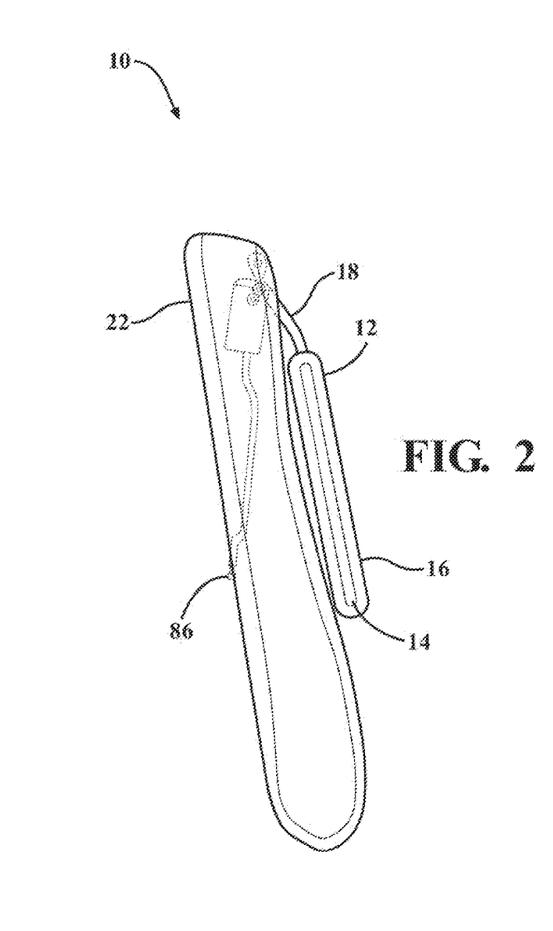
FIG. 2 is a side view of the seat frame assembly illustrating the headrest disposed in a folded headrest position for saving space and avoiding obstructing a rearward view of a driver.
Figure 3:
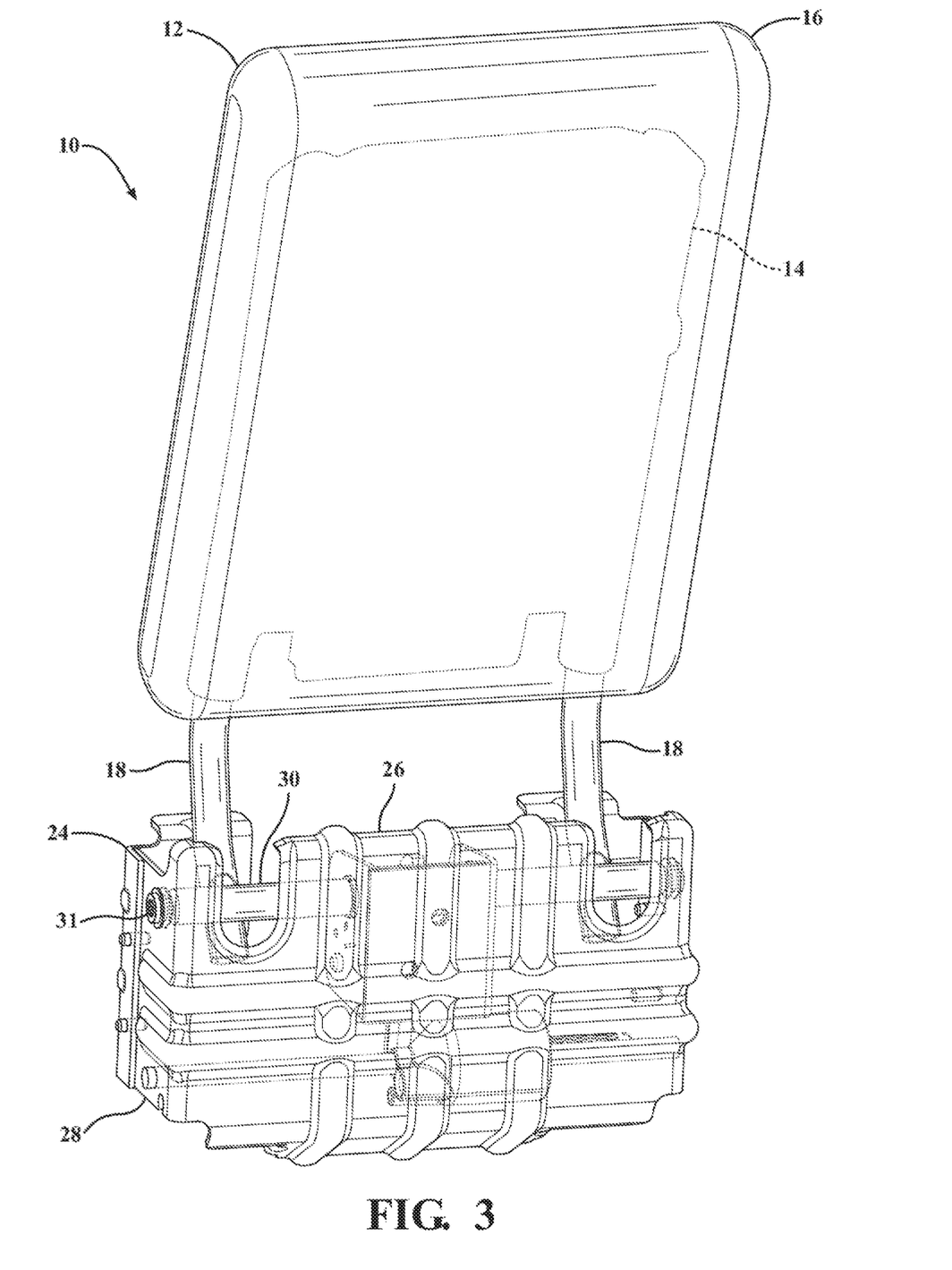
FIG. 3 is a front perspective view of the seat frame assembly illustrating the headrest disposed in the upright headrest position.

Referring to the drawings, wherein like numerals indicate corresponding parts throughout the several views, a vehicle seat 10 is generally shown in FIGS. 1 and 2. As best illustrated in FIGS. 1 and 2 the vehicle seat 10 includes a seatback 22 and a headrest 12 operably connected thereto. FIG. 1 illustrates the headrest 12 in an upright position, and FIG. 2 showing the headrest 12 in a folded position for avoiding obstructing a rearward view of a driver. As best illustrated in FIG. 3, the headrest 12 includes a headrest frame 14 surrounded by a headrest cushion 16. The headrest cushion 16 may be surrounded by a trim cover. A pair of support poles 18 extend downward from the headrest frame 14 to respective pole ends 20. The seatback 22 includes a seatback frame 24 generally connected to the poles 18.

Figure 4:
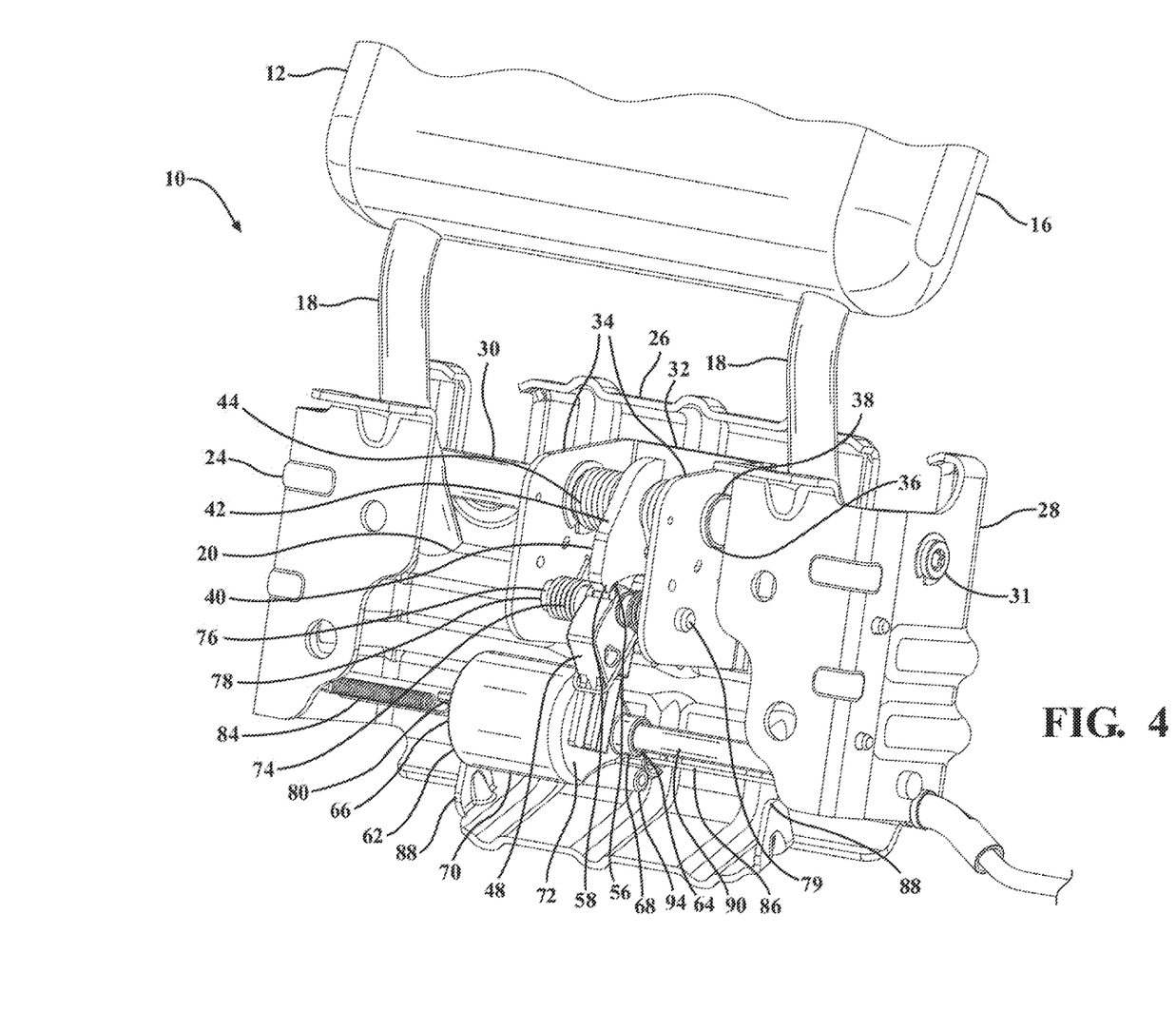
FIG. 4 is a is a partial rear perspective view of the seat frame assembly illustrating the headrest disposed in the upright headrest position and a locking mechanism including a ratchet disposed in an upright ratchet position and a pawl disposed in a locked pawl position.
Figure 5:
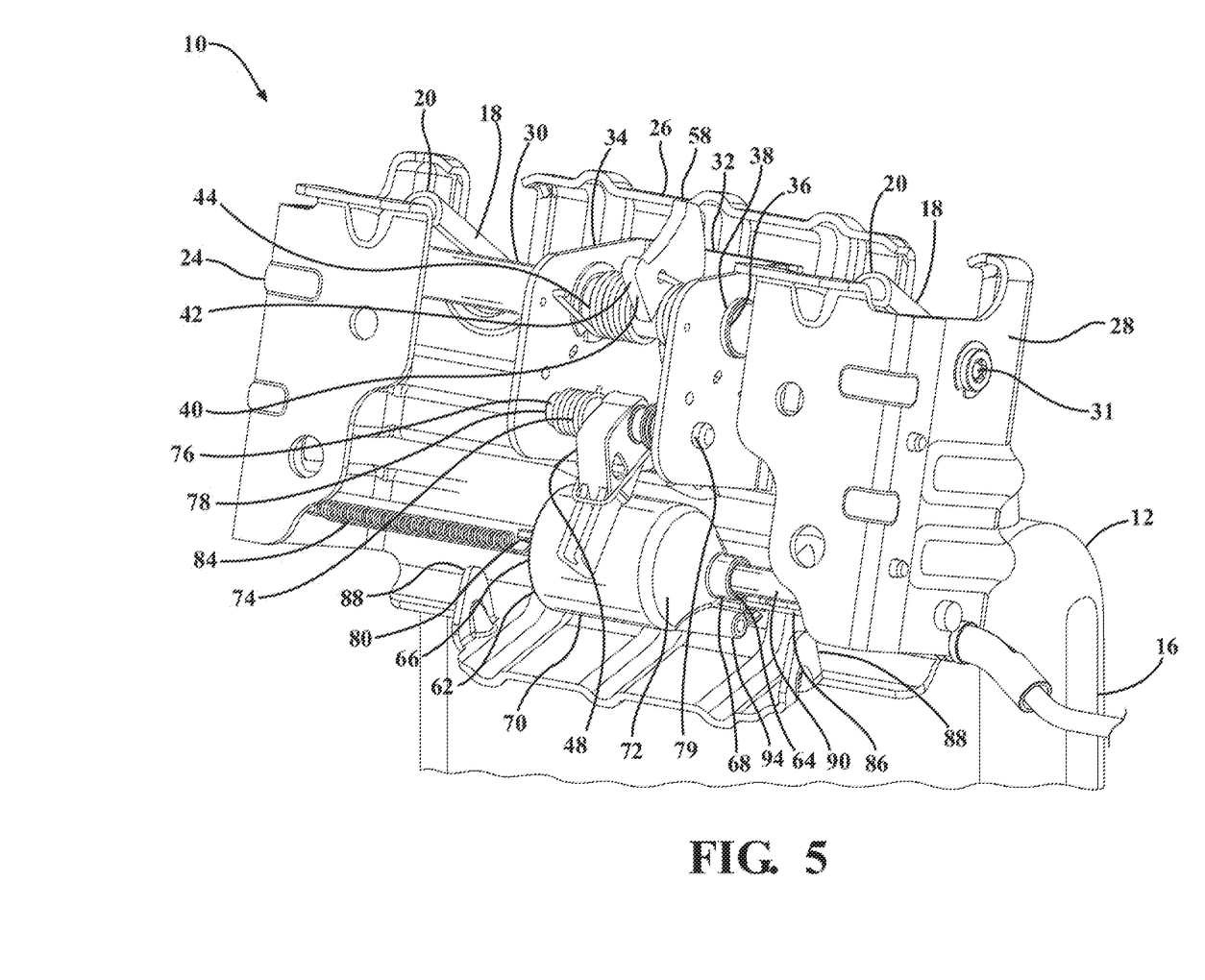
FIG. 5 is a is a partial rear perspective view of the seat frame assembly illustrating the headrest disposed in the folded headrest position, the ratchet disposed in a folded ratchet position, and the pawl disposed in an unlocked pawl position.

As best shown in FIGS. 3-5, the seatback frame 24 includes a central body 26 and a pair of outer brackets 28 which extend outward from the central body 26 in spaced and aligned relationship with one another. A crossbar 30 is disposed within the seatback 22, extends between the outer brackets 28, and is secured to the pole ends 20 for facilitating concurrent rotation of the headrest frame 14 with the crossbar 30. The crossbar 30 may be secured to the pole ends 20 by welding. The crossbar 30 is rotatably supported within the outer brackets 28 by outer bushings 31 that allow the crossbar 30 to rotate relative to the outer brackets 28.

The vehicle seat 10 is generally a third-row type seat, which, as described previously, has different packaging considerations relative to second-row seating. As such, it is preferable for the vehicle seat 10 to fold down into a more compact position than that of second-row seating. This may be accomplished by making the headrest 12 thinner relative to headrests used for second-row seating and having a pivot point, in this case the crossbar 30, located within the seatback 22 and not within the headrest 12. Relative to placing the crossbar 30 in the headrest 12, placing the crossbar 30 in the seatback 22 increases a distance between a top of the headrest 12 and the crossbar 30 thus increases the torque placed on the crossbar 30. This increased torque may require improvements in structural rigidity. A seat 10 having its crossbar 30, and thus its pivot point, within the seatback 22 can be referred to as a low-pivot folding assembly.

As best shown in FIGS. 4 and 5, an inner support member 32 is secured to the central body 26 of the seatback frame 24. The inner support member 32 includes a pair of inner support flanges 34 disposed between the pair of outer brackets 28. Each of the inner support flanges 34 defines a crossbar support 36. The crossbar supports 36 are through-holes passing through the inner support flanges 34. The crossbar 30 passes through the crossbar supports 36, and a pair of inner bushings 38 rotatably support the crossbar 30 within the crossbar supports 36 of the inner support flanges 34.

Figures 6, 7, 8:
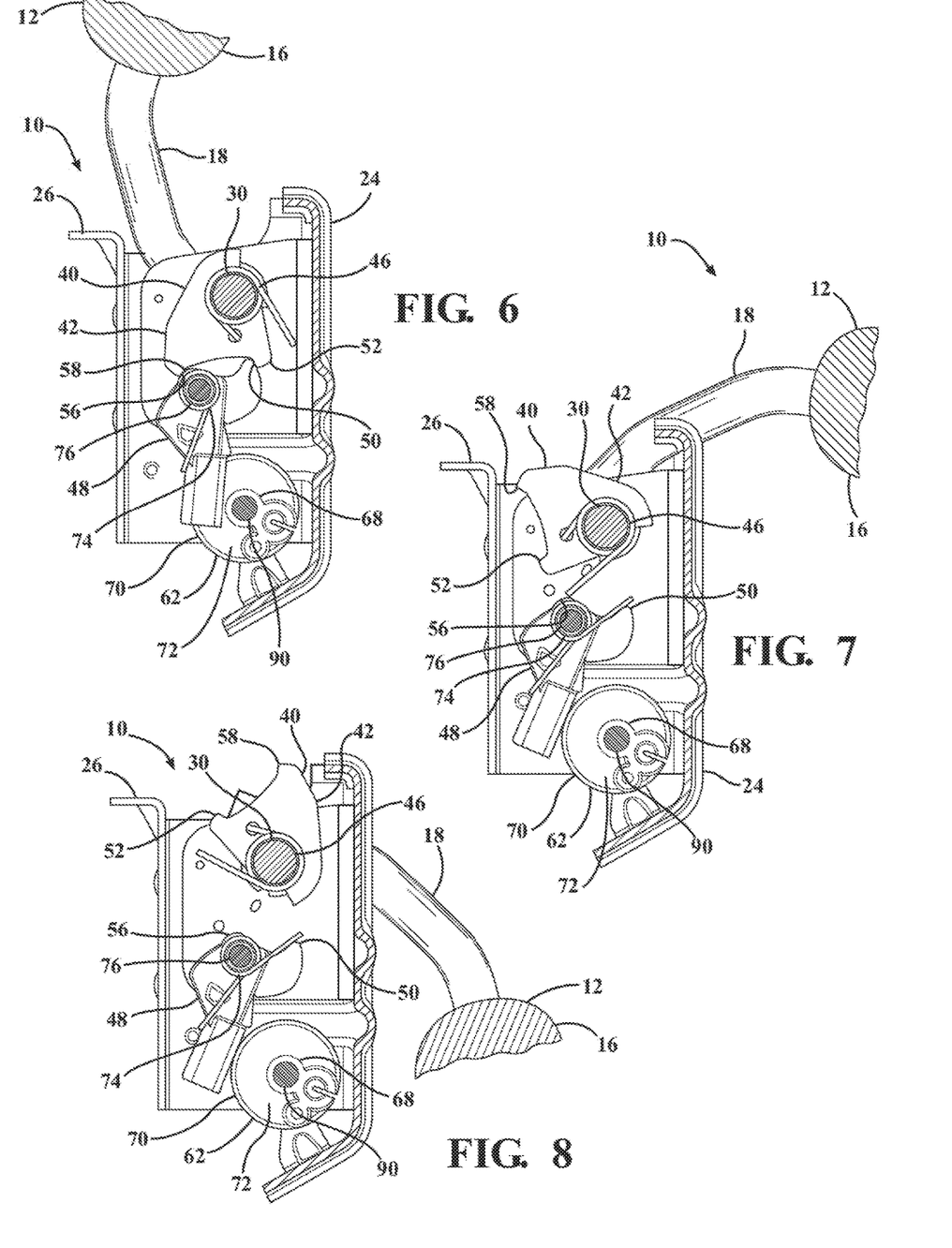
FIG. 6 is a partial cross-sectional side view of the seat frame assembly illustrating the headrest disposed in the upright headrest position, the ratchet disposed in the upright ratchet position, and the pawl disposed in the locked pawl position.
FIG. 7 is a partial cross-sectional side view of the seat frame assembly illustrating the headrest disposed in an intermediate headrest position, the ratchet disposed in an intermediate ratchet position, and the pawl disposed in the unlocked pawl position.
FIG. 8 is a partial cross-sectional side view of the seat frame assembly illustrating the headrest disposed in the folded headrest position, the ratchet disposed in the folded ratchet position, and the pawl disposed in the locked pawl position.

As best shown in FIGS. 3-8, a locking mechanism 40 is housed within the inner support member 32. The locking mechanism 40 is operably interconnected with the crossbar 30 to prevent rotation of the crossbar 30 in a locked condition for maintaining the headrest 12 in an upright headrest position and allow for rotation of the crossbar 30 in an unlocked condition. Rotation of the crossbar 30 allows for movement of the headrest 12 from the upright headrest position, as shown in FIGS. 3, 4, and 6, to an intermediate headrest position, as best shown in FIG. 7, and finally to a folded headrest position, as shown in FIGS. 5 and 8.

The locking mechanism 40 includes a ratchet 42 secured to the crossbar 30 and biased from an upright ratchet position toward a folded ratchet position. The locking mechanism 40 also includes a left biasing spring 44 and a right biasing spring 46 on opposite sides of the ratchet 42. The left and right biasing springs 44, 46 are each wound about the crossbar 30 from respective inner support flanges 34 to the ratchet 42 for establishing the bias toward the folded ratchet position.

Figure 9A:
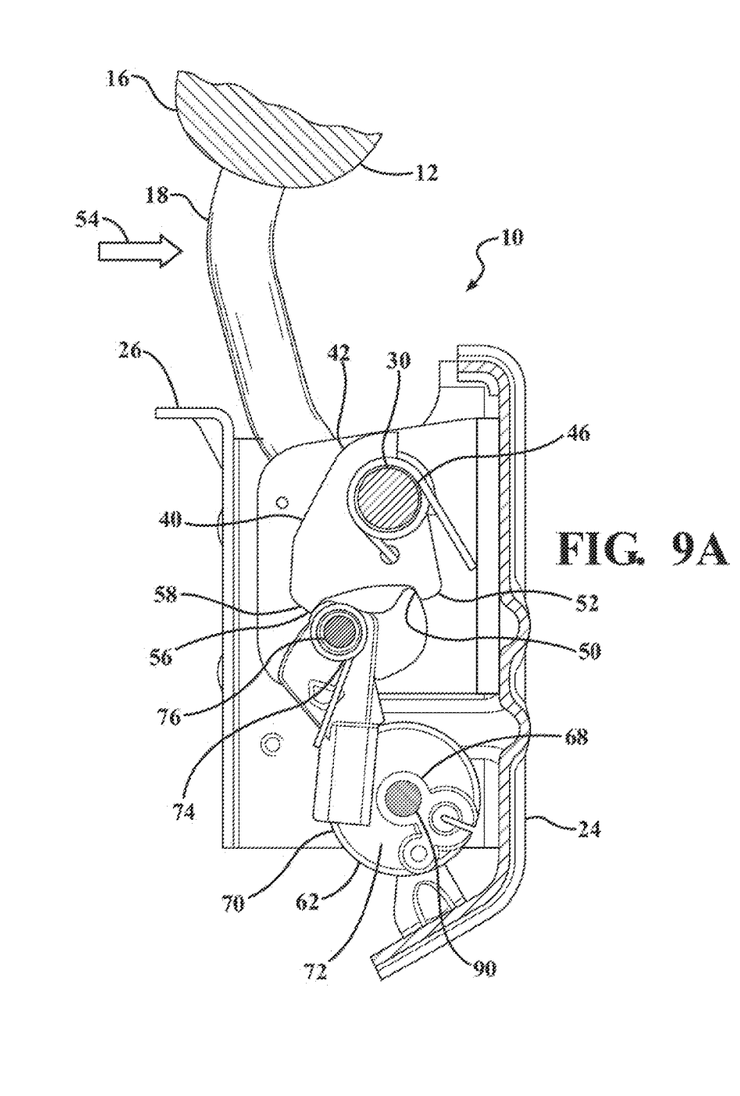
FIG. 9A is a partial cross-sectional side view of the seat frame assembly illustrating a headrest disposed in the upright headrest position and being acted upon by a frontward load.
Figure 9B:
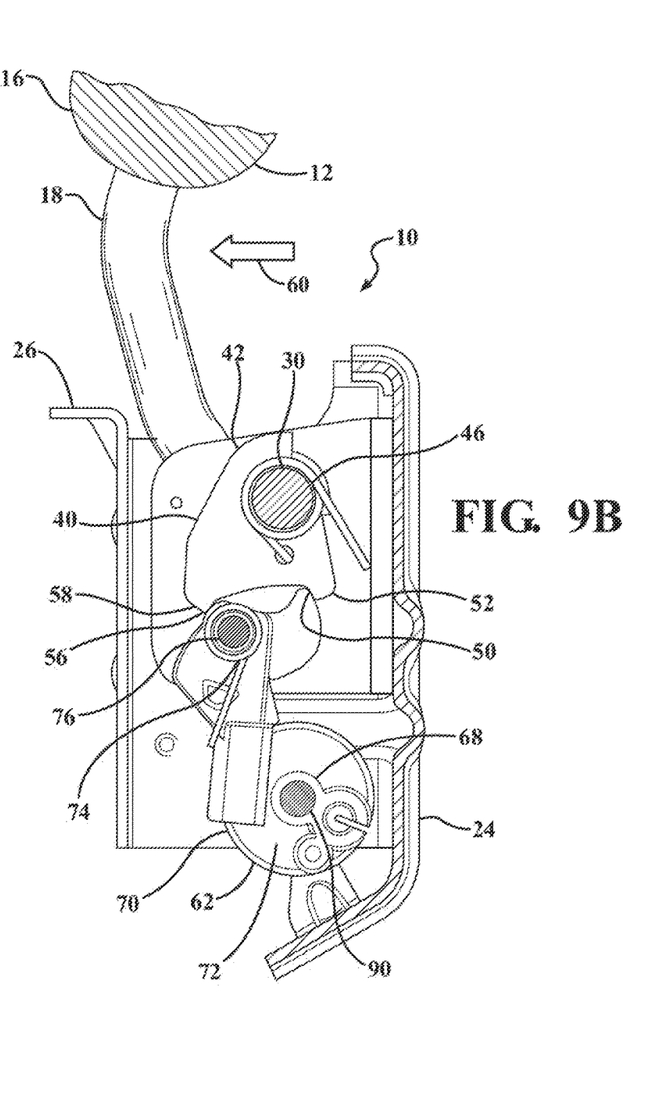
FIG. 9B is a partial cross-sectional side view of the seat frame assembly illustrating the headrest disposed in the upright headrest position and being acted upon by a rearward load.

The locking mechanism 40 includes a pawl 48 movable from a locked pawl position wherein the pawl 48 is in engaged relationship with the ratchet 42 to prevent movement of the ratchet 42 from the upright ratchet position to the folded ratchet position when a frontward load is applied to the headrest 12 to an unlocked pawl position wherein the pawl 48 is disengaged from the ratchet 42. The pawl includes a pawl lip 50 and the ratchet 42 includes a first ratchet lip 52. The first ratchet lip 52 engages the pawl 48 at the pawl lip 50 in the locked pawl position to prevent movement of the ratchet to the folded ratchet position when a frontward load 54 is applied to the headrest 12, as shown in FIG. 9A. The pawl 48 includes a locking surface 56 and the ratchet 42 includes a second ratchet lip 58. The second ratchet lip 58 engages the pawl 48 at the locking surface 56 to limit movement of the ratchet 42 beyond the upright ratchet position when a rearward load 60 that is opposite to the frontward load 54 is applied to the headrest 12, as best shown in FIG. 9B.

An actuator 62 extends from a first end 64 located adjacent the pawl 48 to a second end 66. The actuator 62 is movable from a first actuator position to a second actuator position for engaging the pawl 48 and moving the pawl 48 from the locked pawl position to the unlocked pawl position. The actuator 62 includes a first portion 68 proximate the first end 64 and having a first cross-sectional area taken across a first plane perpendicular to an axis A extending from the first actuator end to the second actuator end, a second portion 70 proximate the second end 66 and having a second cross-sectional area taken across a second plane perpendicular to axis A that is larger than the first cross-sectional area, and a tapered portion 72 tapering from the second portion 70 to the first portion 68. A double twist spring 74 extends from the inner support flanges 34 and into engaged relationship with the pawl 48 for biasing the pawl 48 toward the actuator 62.

Figure 12:
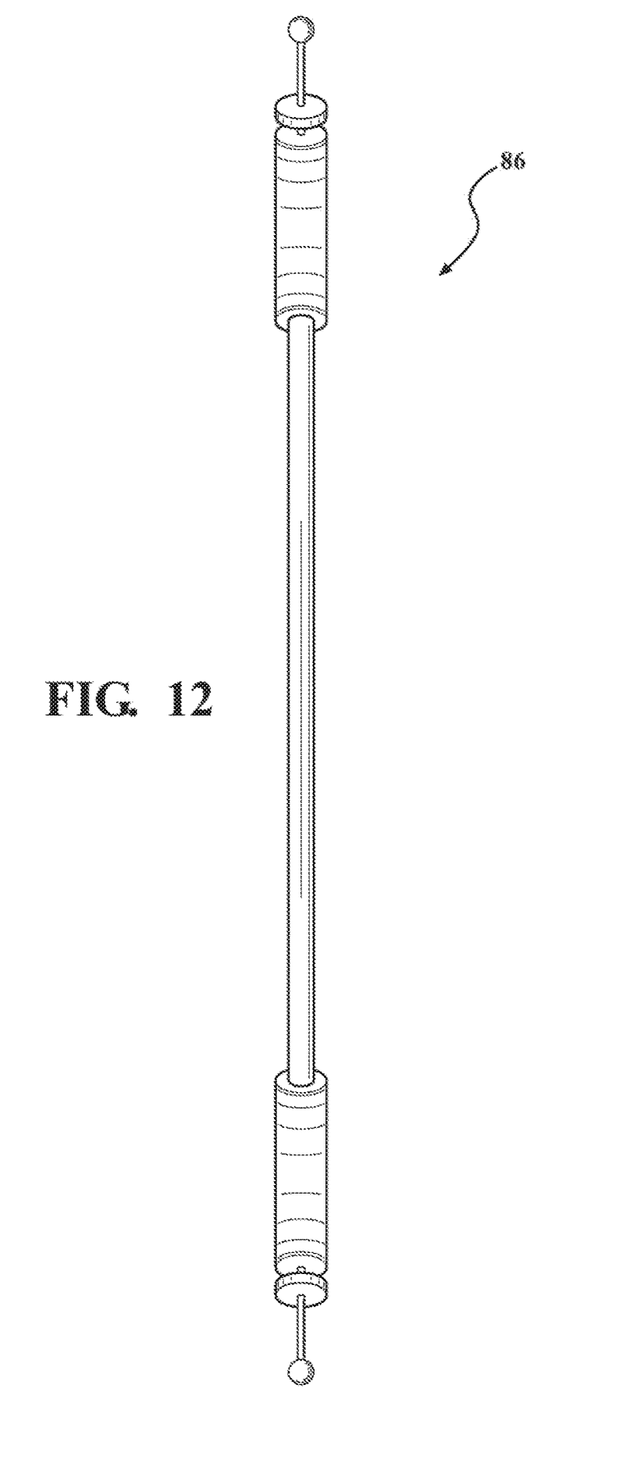
FIG. 12 is a side view of a cable assembly.

A pawl shaft 76 extends between the inner support flanges 34, and the pawl 48 is disposed on the pawl shaft 76. In some embodiments, the pawl shaft 76 is formed as a part of the pawl 48. In some embodiments, the pawl 48 is rotatable about the pawl shaft 76. The double twist spring 74 is wound about the pawl shaft 76, allowing the double twist spring 74 to take on greater loads relative to placement on an encasing lever integral with the pawl, as is done in CN108394328. Each of the inner support flanges 34 define a shaft support 78, and the pawl shaft 76 passes through the shaft supports 78. A pair of shaft bushings 79 rotatably support the pawl shaft 76 within the shaft supports 78 of the inner support flanges 34. The actuator 62 includes a draw spring mount 80 proximate to the second end 66 and a cable mount 82 proximate to the first end 64. A draw spring 84 is connected to the draw spring mount 80 for pulling the actuator 62 toward the first actuator position, such as by a cable assembly 86 that is connected, to the cable mount 82 at the first end 64 of the actuator 62. As known in the art, and with reference to FIG. 12, the cable assembly 86 is configured to pull the actuator 62 from the first actuator position to the second actuator position in response to a pulling motion of the cable assembly 86 initiated by a user.

Movement caused by the pulling motion of the cable assembly 86 initiated by the user moves the actuator 62 from the first actuator position, as best shown in FIG. 4, to the second actuator position, as best shown in FIG. 5. The tapered portion 72 of the actuator 62 causes the pawl 48 of the locking mechanism 40 to begin to rotate from a locked pawl position where the pawl 48 engages the first portion 68 of the actuator 62 and the locking mechanism 40 is in the locked condition, as best shown in FIG. 6, to a unlocked pawl position where the pawl 48 engages the second portion 70 of the actuator 62 and the locking mechanism 40 is in the unlocked condition, as best shown in FIGS. 7 and 8. The pawl lip 50 disengages from the first ratchet lip 52 to allow rotation of the ratchet 42 from the upright ratchet position, as best shown in FIG. 6, through an intermediate ratchet position, as best shown in FIG. 7, toward the folded ratchet position, as best shown in FIG. 8, resulting in movement of the headrest 12 from the upright headrest position to the folded headrest position.

The outer brackets 28 each include movement limiters 88 for limiting a travel of the actuator 62 resulting from the pulling of the cable assembly 86 and biasing provided by the draw spring 84. The second end 66 of the actuator 62 abuts one of the movement limiters 88 in the first actuator position, and the first end 64 of the actuator 62 abuts the other one of the movement limiters 88 in the second actuator position. The movement limiters 88 may be positioned to allow for over-travel of the actuator 62, such that the pawl 48 can engage the second portion 70 at more than just a meeting point between the second portion 70 and the tapered portion 72.

Figure 10:
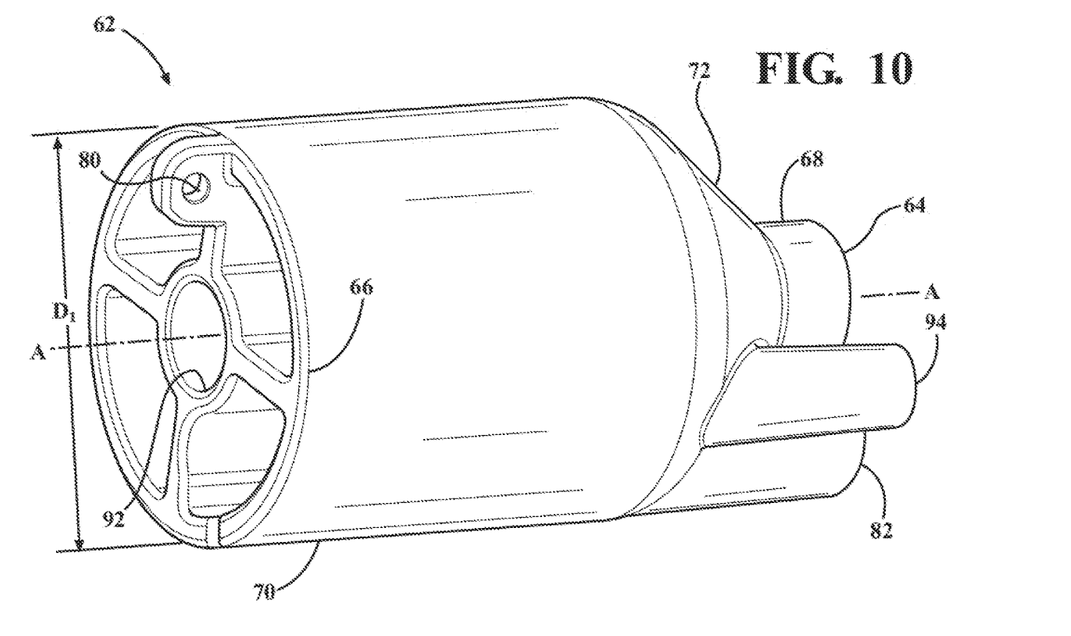
FIG. 10 is a perspective side view of an actuator illustrating the actuator extending from a first end to a second end and having a first portion disposed proximate the first end and having a first diameter and a second portion disposed proximate the second end and having a second diameter, with the first diameter being greater than the second diameter.
Figure 11:
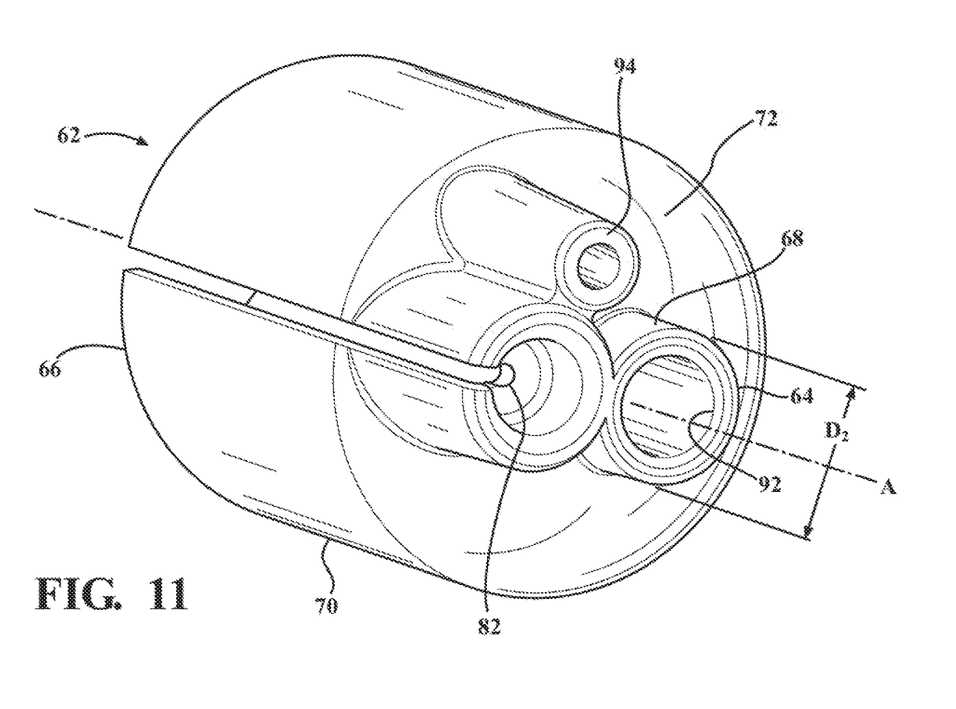
FIG. 11 is a perspective end view of the actuator illustrating a cable mount and stop face of the actuator.

As best shown in FIGS. 10 and 11, the actuator 62 defines a bore 92 that extends between the first end 64 and the second end 66 and along axis A. As best shown in FIGS. 4 and 5, a slide shaft 90 extends between the outer brackets 28 and through the bore 92 for supporting the actuator 62 during movement between the first and second actuator positions.

When the frontward load 54 is applied to the headrest frame 14, as shown in FIG. 9A, the frontward load 54 is transmitted through the support poles 18, provides a rotational force (clockwise relative to the view shown in FIG. 9A) to the crossbar 30, which provides a rotational force on the ratchet 42, which transmits the force through the first ratchet lip 52 to the pawl lip 50, which provides a rotational force (counterclockwise relative to the view shown in FIG. 9A) on the pawl 48, which in turn provides a force on actuator 62, which finally provides a force to the slide shaft 90. Thus, the slide shaft 90 provides structural rigidity and strength to oppose the frontward load 54 when the locking mechanism 40 is in the locked position.

When the rearward load 60 is applied to the headrest frame 14, as shown in FIG. 9B, the rearward load 60 is transmitted through the support poles 18, provides a rotational force to the crossbar 30, which provides a rotational force (counterclockwise relative to the view shown of FIG. 9B) on the ratchet 42, which transmits the force through the second ratchet lip 58 to the locking surface 56, to the pawl 48, and finally to the pawl shaft 76. Thus, the pawl shaft 76 provides structural rigidity and strength in opposing the rearward load 60 when the locking mechanism 40 is in the locked position.

As best shown in FIGS. 10 and 11, the first portion 68 is generally cylindrical in shape and has a first diameter $D_1$, and the second portion 70 is generally cylindrical in shape and has a second diameter $D_2$ that is smaller than the first diameter $D_1$. The first cross-sectional area is the area of a circle produced by rotating diameter $D_1$ about axis A, and the second cross-sectional area is the area of the a circle produced by rotating diameter $D_2$ about axis A. The tapered portion 72 is generally conical in shape. The generally cylindrical shape of the first and second portions 68, 70 and the generally conical shape of the tapered portion 72 allow for a degree of rotational symmetry, allowing the actuator 62 to function properly if rotated off of an initial angular position. An actuator stop face 94 extends from the tapered portion 72 of the actuator 62 proximate the first end 64 for engaging one of the movement limiters 88 and prevents the actuator 62 from moving beyond the second actuator position by engaging one of the movement limiters 88. The cable mount 82 extends from the tapered portion 72 of the actuator 62.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A frame assembly for a vehicle seat comprising:
    a headrest frame including at least one support pole extending downwardly from said headrest frame;
    a seatback frame having a central body and a pair of outer brackets extending outwardly from said central body in spaced relationship to one another;
    a crossbar extending between and rotatable relative to said pair of outer brackets;
    said at least one support pole secured to said crossbar for facilitating concurrent rotation of said headrest frame with said crossbar;
    a locking mechanism operably interconnected with said crossbar and interchangeable between a locked condition and an unlocked condition to respectively prevent and allow rotation of said crossbar;
    an actuator movable from a first actuator position to a second actuator position to engage said locking mechanism and move said locking mechanism from said locked condition to said unlocked condition and allow for concurrent rotation of said crossbar said headrest frame;
    said actuator extending between a first end and a second end and defining a bore extending therebetween; and
    a slide shaft extending between said pair of outer brackets and through said bore for supporting said actuator and allowing said actuator to slide along said slide shaft during movement between said first and second actuator positions.

2. The frame assembly of claim 1, further comprising:
    said actuator including a first portion disposed adjacent said first end having a generally cylindrical shape to define a first diameter;
    said actuator including a second portion disposed adjacent said second end having a generally cylindrical shape to define a second diameter being larger than said first diameter; and
    said actuator including a tapered portion disposed between and tapering from said second portion to said first portion.

3. The frame assembly of claim 2, further comprising:
    said actuator including a cable mount extending from said tapered portion and towards said first end; and
    a cable assembly connected to said cable mount for effectuating movement of said actuator from said first actuator position to said second actuator position.

4. The frame assembly of claim 3, further comprising:
    a draw spring mount extending from said second end of said actuator; and
    a draw spring in connection with said draw spring mount and one of said outer brackets for pulling said actuator toward said first actuator position.

5. The frame assembly of claim 2, further comprising:
    said seatback frame including a pair of movement limiters extending outwardly from said central body in spaced relationship with one another on opposite sides of said actuator for limiting a travel of said actuator.

6. The frame assembly of claim 5, further comprising:
    said actuator including an actuator stop face extending from said tapered portion of said actuator and proximate said first end of said actuator for engaging one of said movement limiters and preventing said actuator from moving beyond said second actuator position.

7. A frame assembly for a vehicle seat comprising:
    a headrest frame including at least one support pole extending downwardly from said headrest frame;
    a seatback frame having a central body and a pair of outer brackets extending outwardly from said central body in spaced relationship to one another;
    a crossbar extending between and rotatable relative to said pair of outer brackets;
    said at least one support pole secured to said crossbar for facilitating concurrent rotation of said headrest frame with said crossbar;
    a locking mechanism operably interconnected with said crossbar and interchangeable between a locked condition and an unlocked condition to respectively prevent and allow rotation of said crossbar;
    an actuator movable from a first actuator position to a second actuator position to engage said locking mechanism and move said locking mechanism from said locked condition to said unlocked condition and allow for concurrent rotation of said crossbar said headrest frame;

a slide shaft extending between said pair of outer brackets and supporting said actuator during movement between said first and second actuator positions;

a pair of inner support flanges disposed between said pair of outer brackets;

said locking mechanism including a ratchet secured to said crossbar and biased from an upright ratchet position toward a folded ratchet position;

said locking mechanism including a pawl movable from a locked pawl position preventing movement of said ratchet from said upright ratchet position toward said folded ratchet position to an unlocked pawl position for allowing movement of said ratchet from said upright ratchet position toward said folded ratchet position;

said actuator disposed into an engaged relationship with said pawl to move said pawl from said locked pawl position to said unlocked pawl position;

a pawl shaft extending between said pair of inner support flanges; and said pawl supported on said pawl shaft and engaged by said actuator during movement of said actuator from said first actuator position to said second actuator position to effectuate movement of said pawl from said locked pawl position to said unlocked pawl position.

8. The frame assembly of claim 7, further comprising:

a double twist spring extending from said pair of inner support flanges, wound about said pawl shaft, and in engaged relationship with said pawl for biasing said pawl toward said actuator.

9. The frame assembly of claim 7, further comprising:

said locking mechanism including at least one biasing spring wound about said crossbar from at least one of said inner support flanges to said ratchet for establishing said bias toward said folded ratchet position.

10. The frame assembly of claim 9, wherein said at least one biasing spring includes a left biasing spring and a right biasing spring disposed on opposite sides of said ratchet and each is wound about said crossbar from a respective one of said inner support flanges to said ratchet for establishing said bias toward said folded ratchet position.

11. The frame assembly of claim 7, further comprising:

said pair of outer brackets each including outer bushings for allowing said crossbar to rotate relative to said pair of outer brackets.

12. The frame assembly of claim 7, further comprising:

each of said inner support flanges defining a crossbar support and said crossbar passing through said crossbar supports.

13. The frame assembly of claim 12, further comprising:

said crossbar supports being a pair through-holes passing through respective ones of said inner support flanges; and a pair of inner bushings rotatably supporting said crossbar within said crossbar supports of said inner support flanges.

14. The frame assembly of claim 7, wherein said pawl includes a pawl lip and said ratchet including a first ratchet lip for engaging said pawl at said pawl lip in said locked pawl position to prevent movement of said ratchet to said folded ratchet position when a frontward load is applied to said headrest frame and said locking mechanism is in said locked condition.

15. The frame assembly of claim 14, wherein said pawl including a locking surface and said ratchet including a second ratchet lip engaging said pawl at said locking surface to limit movement of said ratchet beyond said upright ratchet position when a rearward load being opposite to said frontward load is applied to said headrest frame.

* * * * *